United States Patent [19]

Young

[11] 3,851,111

[45] Nov. 26, 1974

[54] TSPS-HEADPHONE PLUG MESSAGES

[75] Inventor: John Young, Addison, Ill.

[73] Assignee: GTE Automatic Electric Laboratories Incorporated, Northlake, Ill.

[22] Filed: Sept. 14, 1973

[21] Appl. No.: 397,566

[52] U.S. Cl. ............................ 179/51 R, 179/27 FF
[51] Int. Cl. ............................ H04m 5/00
[58] Field of Search ......................... 179/51 R, 1 PC

*Primary Examiner*—William C. Cooper
*Attorney, Agent, or Firm*—John T. Winburn

[57] ABSTRACT

When the operator's headset is plugged in, contacts of the jack operate a relay, which connects ground to conductors of a bus for a "staffed" code. The bus is used principally for keys at the position, with a code for each key. These codes along with the position identity are sent using a key scanner and data link to central control. An acknowledgement of the "staffed" message is returned to a display buffer, to select and operate a relay which causes the "staffed" code to be disconnected from the bus. When the headset is unplugged, release of the first relay with the buffer relay still operated places an "unstaffed" code on the bus, and an acknowledgement of the resulting message causes the buffer relay to be restored. Central control may verify the staffing status by messages to operate and then restore the buffer relay.

3 Claims, 1 Drawing Figure

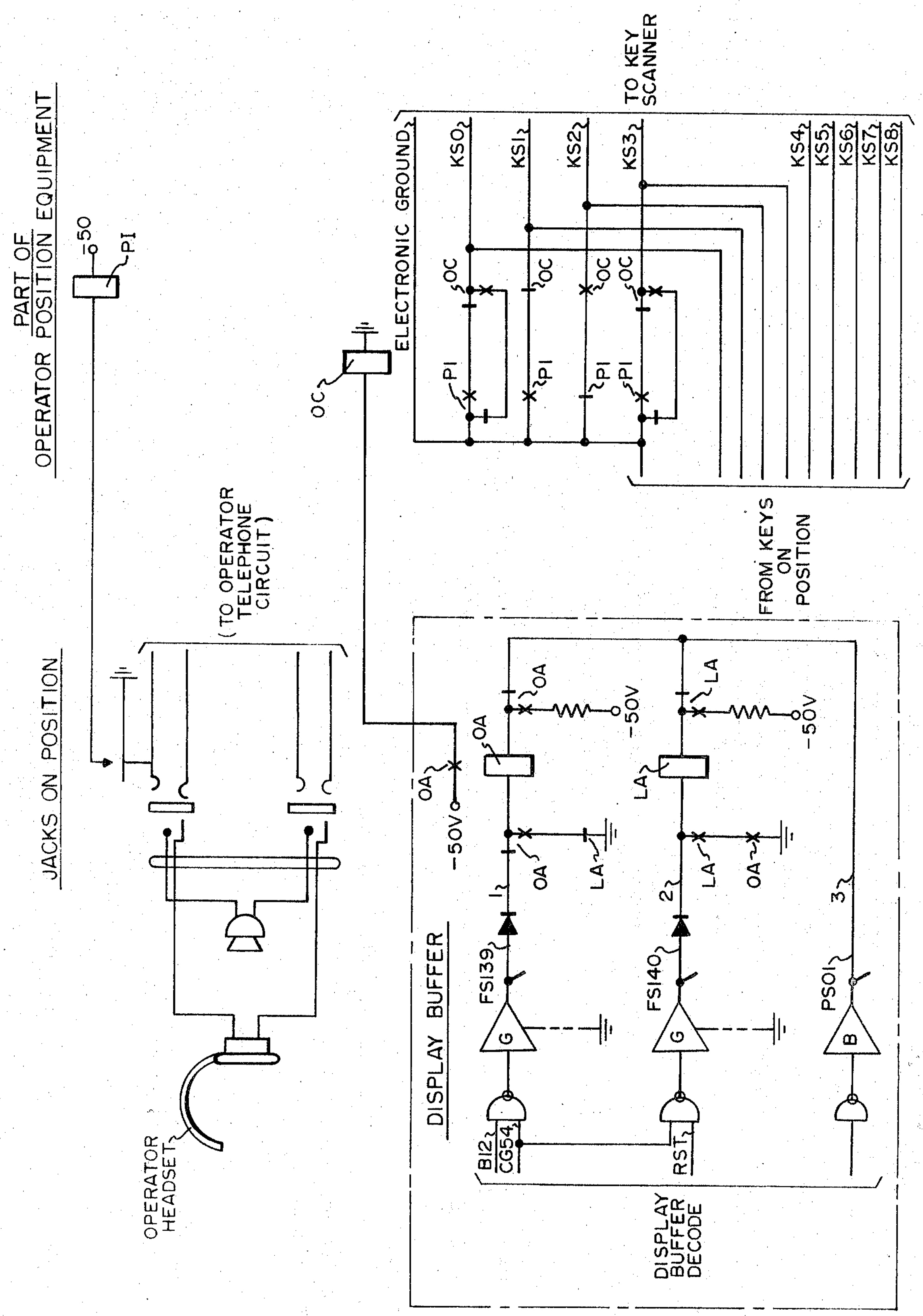
PART OF
OPERATOR POSITION EQUIPMENT
-50
PI
JACKS ON POSITION
(TO OPERATOR TELEPHONE CIRCUIT)
OPERATOR HEADSET
OC
ELECTRONIC GROUND
TO KEY SCANNER
KS0
KS1
KS2
KS3
KS4
KS5
KS6
KS7
KS8
FROM KEYS ON POSITION
DISPLAY BUFFER
OA
LA
-50V
1
2
3
FS139
FS140
PS01
G
B
BI2
CG54
RST
DISPLAY BUFFER DECODE

TSPS-HEADPHONE PLUG MESSAGES

BACKGROUND OF THE INVENTION

1. Field of the Invention

This invention relates to an arrangement for indicating staffing or unstaffing of an operator position;

and more particularly to such an indication in a system having a central control and a plurality of operator positions with data communication between them.

2. Description of the Prior Art

A toll service position system is described in the Bell System Technical Journal, Vol. 49, No. 10, December 1970. See page 2620. Other arrangements for indicating staffing of operator positions are known, some of which use a signal supplied when a headphone is plugged in.

SUMMARY OF THE INVENTION

The invention is incorporated in an arrangement in which a key bus with N conductors is used at each position, with the keys having contacts to place a potential on selected conductors of the bus in a code to indicate operation. A key scanner scans the busses at the positions and supplies messages to a transmitter of the data link to send messages to the central control. The data in these messages identifies the position, and the key operated. Received messages at the data link identify positions, control groups, and a function in the group, principally for operating relays to light lamps at the positions.

According to the invention, a relay is operated when a headphone set is plugged in at a position, and contacts of this relay place potential on leads of the key bus to provide a "staffed" code.

The central control responds to the resulting message to send a message, which causes a display buffer relay to be operated, which operates a slave relay to disconnect the potentials for the "staffed" code from the key bus.

Unplugging of the headset releases the first relay, and via contacts of this and said slave relay, an "unstaffed" code is placed on the key bus. Central control then sends a reset message which restores the buffer display relay and its slave, and the potentials are thereby removed from the key bus.

Central control may verify the staffing status of a position by sending messages to change the state of the buffer display relays, and then restore the previous condition.

CROSS REFERENCE TO RELATED APPLICATIONS

This invention is included in a TSPS system briefly described in the GTE Automatic Electric Technical Journal, Vol. 12, No. 7, July 1971, pages 276–285.

The central processor and peripheral controller are disclosed in a U.S. patent application for Control Complex for TSPS Telephone System, by E. F. Brenski et al., now U.S. Pat. No. 3,818,455.

The data link for communication of data between operator's positions and central control is disclosed in a U.S. application by M. Winn, W. R. Wedmore, and J. S. Young for Data Link Arrangement with Error Checking and Retransmisson Control Ser. No. 397,454 filed the same day as this application.

The key scanner is disclosed in the last said application, and also in a U.S. application by A. Limberg, W. R. Wedmore, and J.S. Young, Ser. No. 395,896, filed on Sept. 7, 1973.

The display buffer is disclosed in a U.S. application by E. S. Bieszizad, W. R. Wedmore, and J. S. Young, Ser. No. 397,570, filed the same day as this application.

DESCRIPTION OF THE DRAWING

The single FIGURE shows an operator's headset and jack and related circuits for indication of staffing of the position.

DETAILED DESCRIPTION

As described in said co-pending applications, the TSPS (toll service position system) includes a control complex with a stored program computer at a base location, and operator's position equipment at traffic offices. There is a duplicated data link between each traffic office and the base location. Each position has a nine-conductor key bus KS0–KS8, and each key has contacts for grounding three of the nine conductors in a code identifying it. A key scanner scans the busses and supplies messages to the data link transmitter to send data messages identifying the position and the key bus code. Messages received from the control complex via the data link are used to control lighting of lamps at the positions and other functions;

these messages being decoded to one out of 64 position numbers PD00-PD63, and 64 control group numbers CG00–CG63. There are four additional bits B12–B15 for a function code.

The position decode outputs, via inverters enable circuits designated main battery switches B (comprising discrete transistors) to place negative battery potential on one of 62 leads PS01 to PS62. (The numbers PD00 and PD63 are used for maintenance and control functions, rather than actual positions.) Thus when a message designates position 01, the decoder enables the main battery switch designated B to supply a negative 50 volts on lead PS01 to lead 3, and also in multiple to other relays for the same position.

The control group signals are used in combination with the function bits to enable circuits designated main ground switches G comprising discrete transistors to place ground potential on function select leads. These leads are connected in multiple to all positions for the same function selection. At each position they are connected via a diode to relays for that function. There is thus a coordinate arrangement of the relays in which a position selection and a function selection to opposite ends of the winding of a relay operates it, and the selected relay then disconnects itself from the select leads and locks over a separate path. The four bits B12–B15 when all are zero are decoded as a signal RST for reset control via function select leads. Thus in the drawing the control groups signal CG54 in coincidence with B12 enables a main ground switch to place ground on lead FS139;

and signal CG54 in coincidence with RST enables a main ground switch to place ground on lead FS140. Lead FS139 is connected to lead 1 of position 01 and corresponding leads at all other positions, while lead FS140 is connected to lead 2 of position 01 and corresponding leads of the other positions.

STAFFING INDICATIONS FOR POSITIONS

When the operator plugs a headset into the position jacks, relay PI operates from ground through the contacts on the jack. (An alternate would have been a contact on the transmitter battery feed relay).

PI closes electronic ground to leads KS0, KS1, and KS3;

this has been defined as the code for "operator staffed". The key scanner logic detects the 3 of 9 code in the the same manner as for any key on that position, resulting in the transmission of a message to the base location.

Software responds to this message by returning a message that is decoded in Buffer Control to activate a battery switch on lead 3 and a ground switch on lead 1, Relay OA operates, disconnects itself from Buffer Control and latches through a break contact on LA.

Relay OA closes relay OC which operates and removes electronic ground from KS0, 1 & 3, the key bus is now open, and can receive other three of nine codes from keys on the position.

When the operator withdraws the headset, relay PI restores, closing electronic ground to leads KS0, 1, & 2, which causes the transmission of the unstaffed message.

Software responds with a message that places battery on lead 3 and ground on lead 2, operating relay LA. OA restores, releasing OC, which again clears the bus. (note that markings on leads 1, 2, 3 from Buffer Control are present for approximately 10 milli-seconds only — this is the standard control scheme for other functions as well). LA restores, returning the circuit to normal.

The combination PI/OC may be described as an exclusive or — if their states different a marking code will be placed on the key bus. Therefore, software has the capability for interrogating the position status by changing the state of OC.

It may be worth noting that his same scheme is employed for a maintenance function also — power up/-down on the standby Control Frame is reported and/or interrogated in the same manner.

What is claimed is:

1. An operator's position staffing condition indication arrangement for use in a system having a central control unit and a group of operator positions, with a data link having a local terminal coupled to the control unit and a remote terminal coupled to said group, having a transmitter and receiver at each terminal;

each position having an N-conductor key bus with keys having contacts to connect a potential to selected conductors of the bus in a code designating the key, the key busses of the positions being scanned by the scanner, which supplies signals to the remote transmitter to send messages identifying the position and the key code;

a display buffer having relays with contacts connected to light lamps and to control other functions at the positions, the display buffer relays being operated in response to messages received via the remote terminal receiver, with data designating a position and a function;

said arrangement comprising a position indication relay and means to operate it responsive to plugging in of an operator's headset and release it responsive to unplugging of the headset, the position indication relay having contacts to connect potential to conductors of the key bus for a "staffed" code, so that a corresponding message is sent to the common control unit via the data link;

and an acknowledgement "position occupied" message is returned;

a "position occupied" display buffer relay which is operated and locked in response to the "position occupied" message, "position occupied" contact means operated in response to the "position occupied" relay being operated, the "position occupied" contact means being effective to disconnect the potential from the bus for the "staffed" code while the position indication relay remains operated;

means comprising contacts of the position indication relay and said "position occupied" contact means effective upon release of the position indication relay upon unplugging of the headset to apply potential to conductors of the key bus for an "unstaffed" code, so that a corresponding message is sent to the common control unit via the data link, and an acknowledgement "position not occupied" message is returned;

means responsive to the "position not occupied" message to release the "position occupied" relay, which via said "position occupied" contact means causes the potential to be removed from the key bus for the "unstaffed" code.

2. An arrangement as claimed in claim 1, having a slave relay operated when the "position occupied" relay of the display buffer is operated, said "position occupied" contact means comprising contacts of the slave relay.

3. An arrangement as claimed in claim 2, wherein the display buffer includes a release relay which operates in response to the "position not occupied" message to cause release of the "position occupied" relay, after which the release relay is restored.

* * * * *